United States Patent
Shelton et al.

(10) Patent No.: US 10,188,983 B2
(45) Date of Patent: Jan. 29, 2019

(54) SYSTEMS AND METHODS FOR CATALYST SCREENS IN SELECTIVE CATALYTIC REDUCTION REACTORS

(71) Applicant: Integrated Global Services, Inc., Midlothian, VA (US)

(72) Inventors: Jeff Landers Shelton, Jacksonville, AL (US); Andrew Scott Kline, Richmond, VA (US)

(73) Assignee: Integrated Global Services, Inc., Richmond, VA (US)

( * ) Notice: Subject to any disclaimer, the term of this patent is extended or adjusted under 35 U.S.C. 154(b) by 0 days.

(21) Appl. No.: 15/388,401

(22) Filed: Dec. 22, 2016

(65) Prior Publication Data

US 2018/0178164 A1    Jun. 28, 2018

(51) Int. Cl.
  *B01D 53/94*  (2006.01)
  *B01D 53/86*  (2006.01)
  *B01J 33/00*  (2006.01)

(52) U.S. Cl.
  CPC ..... *B01D 53/8631* (2013.01); *B01D 53/9418* (2013.01); *B01D 53/9431* (2013.01); *B01J 33/00* (2013.01)

(58) Field of Classification Search
  CPC .............. B01D 53/565; B01D 53/8631; B01D 2251/2067; F01N 3/2066; F01N 3/208; F01N 2240/20
  USPC ......................................................... 422/176
  See application file for complete search history.

(56) References Cited

U.S. PATENT DOCUMENTS

| | | | | |
|---|---|---|---|---|
| 4,478,766 A | * | 10/1984 | Horikita | B01F 3/04262 210/221.2 |
| 6,449,947 B1 | * | 9/2002 | Liu | B01D 53/9431 60/286 |
| 6,712,869 B2 | * | 3/2004 | Cheng | B01D 46/0043 422/176 |
| 9,005,535 B2 | * | 4/2015 | Wikaryasz | F01N 3/103 422/176 |
| 2006/0210721 A1 | | 9/2006 | Hall | |
| 2010/0273643 A1 | | 10/2010 | Gadgil et al. | |
| 2011/0048234 A1 | | 3/2011 | Iannacchione | |
| 2012/0031429 A1 | | 2/2012 | Varner et al. | |
| 2014/0090560 A1 | | 4/2014 | Buzanowski et al. | |
| 2014/0099247 A1 | * | 4/2014 | Jangiti | B01D 53/565 423/239.1 |
| 2015/0082983 A1 | | 3/2015 | Buzanowski et al. | |

OTHER PUBLICATIONS

International Search Report and Written Opinion issued for PCT/US2017/063453, dated Feb. 15, 2018, 9 pages.

* cited by examiner

*Primary Examiner* — Tom P Duong
(74) *Attorney, Agent, or Firm* — Norton Rose Fulbright US LLP

(57) ABSTRACT

A system for use in selective catalytic reduction reactor is disclosed. The system may include a catalyst bed and a screen located close to the catalyst bed in a manner so that flow of flue gas to the catalyst bed contacts the screen before it contacts the catalyst bed. The screen may be adapted to support a weight of at least 400 pounds above the catalyst bed so that the weight is not imposed on the catalyst. The screen may have a plurality of holes across its surface in a manner so that the screen is adapted to change the velocity distribution of the flue gas as it flows through the screen.

20 Claims, 6 Drawing Sheets

SYSTEMS AND METHODS FOR CATALYST SCREENS IN SELECTIVE CATALYTIC REDUCTION REACTORS

TECHNICAL FIELD

The present invention is related to selective catalytic reduction reactors. More specifically, the present invention is related to systems and methods for providing screens to protect catalyst in selective catalytic reduction reactors.

BACKGROUND OF THE INVENTION

Selective catalytic reduction reactors are used to convert nitrous oxides ($NO_x$), to nitrogen ($N_2$) and water ($H_2O$). The selective catalytic reduction process is typically carried out to prevent the nitrous oxides from entering and polluting the atmosphere. Nitrous oxides are produced by different types of industrial equipment such as boilers, engines, and turbines. For example, in power stations that use coal to generate electricity, flue gases emanating from boilers in the power stations contain nitrous oxides.

The selective catalytic reduction process involves adding a reductant to the flue gas and passing the flue gas through a bed of catalyst to convert the nitrous oxides. The reductant may include ammonia or urea and the catalysts may include zeolites, metal oxides such as vanadium oxide and titanium oxides, and the like.

For boilers powered by coal, ash produced as a result of burning the coal may be transported by the flue gas to the catalyst, where the ash may bind to and plug the catalyst. Ash typically comprises silicon dioxide, calcium oxide, carbon and many other constituents depending on the makeup of the coal being burned. The combustion ash particles are usually small (up to 300 micro meters in diameter) and so they are easily suspended in the flue gas. However, the combustion ash particles can form large particle ash (LPA), which may have a diameter exceeding 1 centimeter. The LPA can plug the openings in the catalyst. Thus, screens are provided to remove LPA particles from the flue gas before they get to the catalyst. For example, patent application Ser. No. 13/633,717, entitled, "Apparatus and Methods for Large Particle Ash Separation From Flue Gas Using Screens Having Semi-Elliptical Cylinder Surfaces," filed Oct. 2, 2012 to Buzanowski et al., describes screens for separating ash particles from the flue gas. In addition to such screens for separating LPA from the flue gas, selective catalytic reduction reactors are provided with protective catalyst wire mesh screens that are placed above the catalyst. The catalyst is a very expensive component of the selective catalytic reactor and the catalyst wire mesh screen is designed to allow personnel, when the reactor is not in operation, to walk in the reactor, on top of the catalyst wire mesh screen, without damaging the catalyst. In some instances, the catalyst wire mesh screen is designed to have slightly smaller openings than the openings in the catalyst so that there is a buildup of ash particles from the flue gas on the catalyst wire mesh screen instead of the catalyst.

FIG. 1 shows prior art selective catalytic reduction reactor system 10. Selective catalytic reduction reactor system 10 shows equipment related to a selective catalytic reduction process in a typical coal fired power plant. In boiler 100, coal is mixed with air (from preheater 101) and burned. The burning coal causes an increase in temperature in boiler 100 so that water injected into boiler 100 is vaporized to form steam. The burning coal produces ash particles 102 (including LPA 102A and fly ash 102B), which flows with hot flue gas 103 through duct 104A. Duct 104A leads to LPA screen separator 105. LPA screen separator 105 has holes having a diameter so that flue gas 103 and fly ash 102B pass through LPA screen separator 105. However, LPA 102A particles are too big to pass through the holes of LPA screen separator 105.

Because these LPA 102A particles are too big to pass through the holes of LPA screen separator 105, they accumulate in hopper 106. Flue gas 103 and fly ash 102B passes through LPA screen separator 105 and enters duct 104B. Duct 104B channels flue gas 103, fly ash 102B, and reductant 107 to selective catalytic reduction (SCR) reactor 108. SCR reactor 108 removes nitrous oxides from flue gas 103 by converting the nitrous oxides to nitrogen and water in a reduction reaction. Catalyst bed 109 facilitates this conversion by speeding up the reduction reaction when flue gas 103, fly ash 102B, and reductant 107 are passed through catalyst bed 109. Flue gas 112, leaving catalyst bed 109, has a reduced amount of $NO_x$ compared with flue gas 103 and is discharged into the atmosphere or cleaned further and then discharged into the atmosphere.

Ash particles small enough to pass through LPA screen separator 105 (e.g., fly ash 102B) may accumulate on catalyst wire mesh screen 110 or in SCR catalyst bed 109. The accumulation of fly ash 102B on catalyst wire mesh screen 110 and/or in SCR catalyst bed 109 may negatively affect the performance of SCR catalyst bed 109 and the catalytic reduction process. Thus, when fly ash 102B accumulates sufficiently on catalyst wire mesh screen 110, cleaning equipment 111 may be used to clear away those ash particles. Cleaning equipment 111 may include air cannon cleaning equipment and/or sonic horn cleaning equipment.

The sonic horn is a low frequency, high energy acoustic horn used as a cleaning mechanism. When the sonic horn emits low frequency sound, the sound waves vibrate fly ash (e.g., fly ash 102B) and dislodge it from where it has settled. If the sound doesn't dislodge fly ash 102B, it just vibrates and gets packed into the catalyst wire mesh screen. Because of the rough finish of catalyst wire mesh screen 110, the sonic horns tend to displace and lodge fly ash 102B into catalyst wire mesh screen 110 and create a buildup of the fly ash. If the sonic horns sufficiently vibrates and dislodges fly ash 102B particles, then either gas flow or gravity moves the fly ash 102B deposits away from catalyst wire mesh screen 110. But when the sonic horns are not able to vibrate fly ash 102B particles enough to get them off catalyst wire mesh screen 110, then fly ash 102B particles get packed in and on catalyst wire mesh screen 110.

Generally, fly ash 102B particles are smaller than the holes in catalyst wire mesh screen 110. Catalyst wire mesh screen 110 is designed so that most of fly ash 102B particles flow through the mesh wire and through the catalyst. However, because of the rough surfaces on catalyst wire mesh screen 110, fly ash 102B particles get attached to the rough surfaces and then fly ash 102B particles are packed on catalyst wire mesh screen 110 by the sonic horns.

The performance of SCR catalyst bed 109 may also be affected by unequal flue gas velocity flowing through SCR catalyst bed 109. Such unequal flue gas velocity flow may erode SCR catalyst bed 109. High velocity flue gas flow through the catalyst erodes and damages the catalyst. On the other hand, if the flue gas velocity is too low, it may cause fly ash 102B particles to accumulate on catalyst wire mesh screen 110. This may cause a buildup of piles of fly ash particles above catalyst bed 109 on catalyst wire mesh screen 110. Such fly ash piles can cause angled flow of the flue gas and can increase velocity of the flue gas, both of which may cause or exacerbate erosion of the catalyst in SCR catalyst bed 109. Further, uneven velocity distribution may affect residency and effectiveness of catalyst to fully catalyze chemical reaction.

BRIEF SUMMARY OF THE INVENTION

A discovery has been made of a screen for use in selective catalytic converter reactors to protect the catalyst in the selective catalytic converter reactors whilst adjusting the flow of flue gas to the catalyst as it passes through the screen. Adjusting the flow of the flue gas flowing to the catalyst may involve adjusting the velocity distribution of the flue gas as it flows through the screen towards the catalyst. The screen may also be adapted to have a smooth surface, which resists fly ash accumulation and improves the effectiveness of air cannon and sonic horn cleaning processes implemented in selective catalytic converter reactors. Further, the screen may have a domed shape, which resists fly ash accumulation on the screen.

In existing systems, potential failure of a primary LPA Screen (e.g., LPA screen separator 105) may cause LPA to pass through to the reactor. Screens according to embodiments of the invention, can act as an additional protection barrier for the catalyst. Further, LPA are usually uneven in geometry. Some particles may be round and some may be long and thin. Particles may pass through the primary LPA screen because of this. Screens, according to embodiments of the invention, can act as an additional protection barrier for the catalyst.

Embodiments of the invention include a system for use in a selective catalytic reduction reactor. The system may include a catalyst bed and a screen located at a distance in a range of 1 in. to 12 ft. above the catalyst bed. In this way, flue gas flowing to the catalyst bed contacts the screen or passes through the screen before it contacts the catalyst bed or passes through the catalyst bed. The screen may be adapted to support a weight of at least 400 pounds above the catalyst bed so that the weight of the body is not imposed on the catalyst of the catalyst bed. The screen has a plurality of holes across its surface. Overall velocity distribution of the flue gas flowing through the screen can be quantified in terms of Root Mean Square (RMS). The screen may be adapted to change the velocity distribution of the flue gas as the flue gas flows through the screen, where the change in velocity distribution by the screen results in a 3 to 6% decrease or improvement in RMS of the overall velocity distribution of the flue gas.

Embodiments of the invention include a method for protecting a catalyst bed in a selective catalytic reduction reactor. The method may include disposing a screen at a distance in a range of 2 in. to 12 ft. above the catalyst bed so flue gas flowing to the catalyst bed contacts the screen or passes through the screen before it contacts the catalyst bed or passes through the catalyst bed. Overall velocity distribution can be quantified in terms of RMS. The screen may be adapted to withstand a weight of at least 400 pounds without that weight being imposed on the catalyst of the catalyst bed. The screen has a plurality of holes across its surface. The method may also include flowing the flue gas through the screen. Further, the method may include changing the velocity distribution of the flue gas as it flows through the screen, wherein the change in velocity distribution by the screen results in a 3 to 6% decrease or improvement in RMS of the overall velocity distribution of the flue gas.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A discovery has been made of a catalyst screen for use in selective catalytic converter reactors that protect catalyst in the selective catalytic reduction reactors whilst solving the aforementioned problems with convention catalyst wire mesh screens. In embodiments of the invention, the flow of the flue gas to the catalyst is adjusted by the catalyst screen. Adjusting the flow of the flue gas to the catalyst may involve adjusting the velocity distribution of the flue gas as it flows through the screen towards the catalyst. Adjusting the velocity distribution in this way can help the catalyst bed to operate more efficiently. The catalyst screen may also be adapted to have a smooth surface, which causes the screen to resist fly ash accumulation and improves the effectiveness of air cannon and sonic horn cleaning processes implemented in selective catalytic converter reactors. Further, the catalyst screen may also have a domed shape, which also helps to repel the buildup of fly ash on the catalyst screen.

Figure 1:
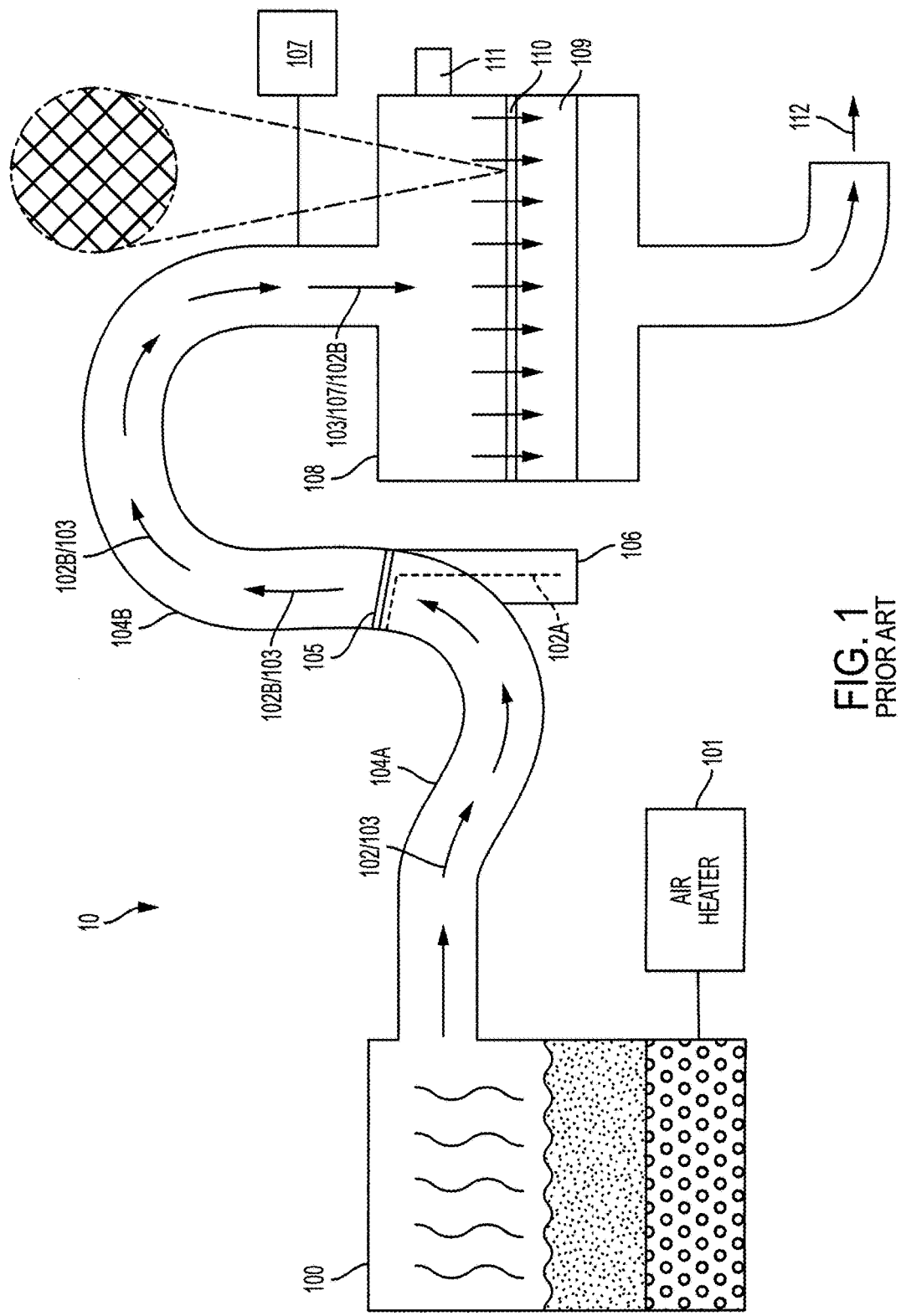
FIG. 1 shows a prior art selective catalytic reduction reactor system.
Figure 2:
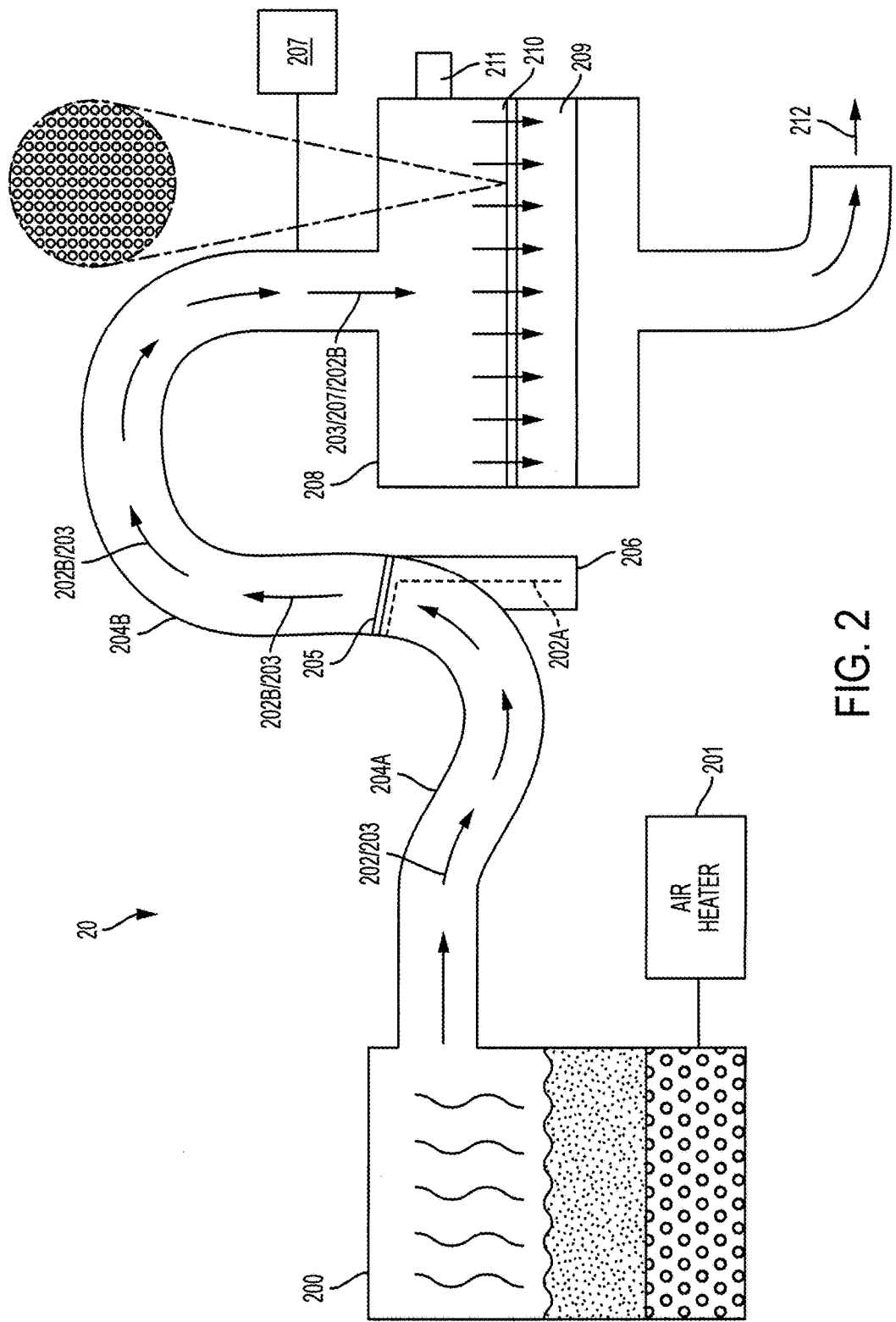
FIG. 2 shows a selective catalytic reduction reactor system, according to embodiments of the invention.

FIG. 2 shows selective catalytic reduction reactor system 20, according to embodiments of the invention. Selective catalytic reduction reactor system 20 shows equipment related to a selective catalytic reduction process of a coal fired power plant, according to embodiments of the invention. In boiler 200, coal is mixed with air (from preheater 201) and burned. The burning coal causes an increase in temperature in boiler 200 so that water injected into boiler 200 is vaporized to form steam. The burning coal produces ash particles 202 (including LPA 202A and fly ash 202B), which flows with hot flue gas 203 through duct 204A. Duct 204A leads to LPA screen separator 205. LPA screen separator 205 has holes having a diameter so that flue gas 203 and fly ash 202B pass through LPA screen separator 205. However, LPA 202A particles are too big to pass through the holes of LPA screen separator 205.

Because these LPA 202A particles are too big to pass through the holes of LPA screen separator 205, they accumulate in hopper 206. Flue gas 203, along with fly ash 202B, passes through LPA screen separator 205 and enters duct 204B. Reductant 207 may be injected into duct 204B. Duct 204B channels flue gas 203, fly ash 202B, and reductant 207 to SCR reactor 208. SCR reactor 208 removes nitrous oxides from flue gas 203 by converting the nitrous oxides to nitrogen and water in a reduction reaction. Catalyst bed 209 facilitates this conversion by speeding up the reduction reaction when flue gas 203, fly ash 202B, and reductant 207 are passed through catalyst bed 209. Flue gas 212, leaving SCR catalyst bed 209, has a reduced amount of $NO_x$ compared with flue gas 203 and is discharged into the atmosphere or cleaned further and then discharged into the atmosphere. Fly ash 202B flows with the flue gas through the catalyst and is collected by either a bag house or a precipitator.

In embodiments of the invention, ash particles small enough to pass through LPA screen separator 205 (e.g., fly ash 202B) may contact catalyst plate screen 210. However, catalyst plate screen 210 is adapted so that it reduces the tendency for fly ash 202B to accumulate thereon as compared to when fly ash 102B contacts catalyst wire mesh screen 110. In embodiments of the invention, catalyst plate screen 210 has a smooth surface so that the friction between fly ash 202B and the surface of catalyst plate screen 210 is sufficiently low so that fly ash 202B easily slides off and does not accumulate on catalyst plate screen 210. And if some fly ash 202B does accumulate on catalyst plate screen 210, the low friction surface of catalyst plate screen 210 is such that it is much easier for cleaning equipment 211 to clear away fly ash 202B as compared to when fly ash 102B is deposited on catalyst wire mesh screen 110. Cleaning equipment 211 may include canon cleaning equipment and sonic horn cleaning equipment.

In embodiments of the invention, the performance of SCR catalyst bed 209 may be improved by normalizing unequal gas velocity flowing through SCR catalyst bed 209. In this way, the possibility of erosion of SCR catalyst bed 209 as a result of unequal gas velocity flow through SCR catalyst bed 209 is eliminated or at least reduced.

Figure 3A:
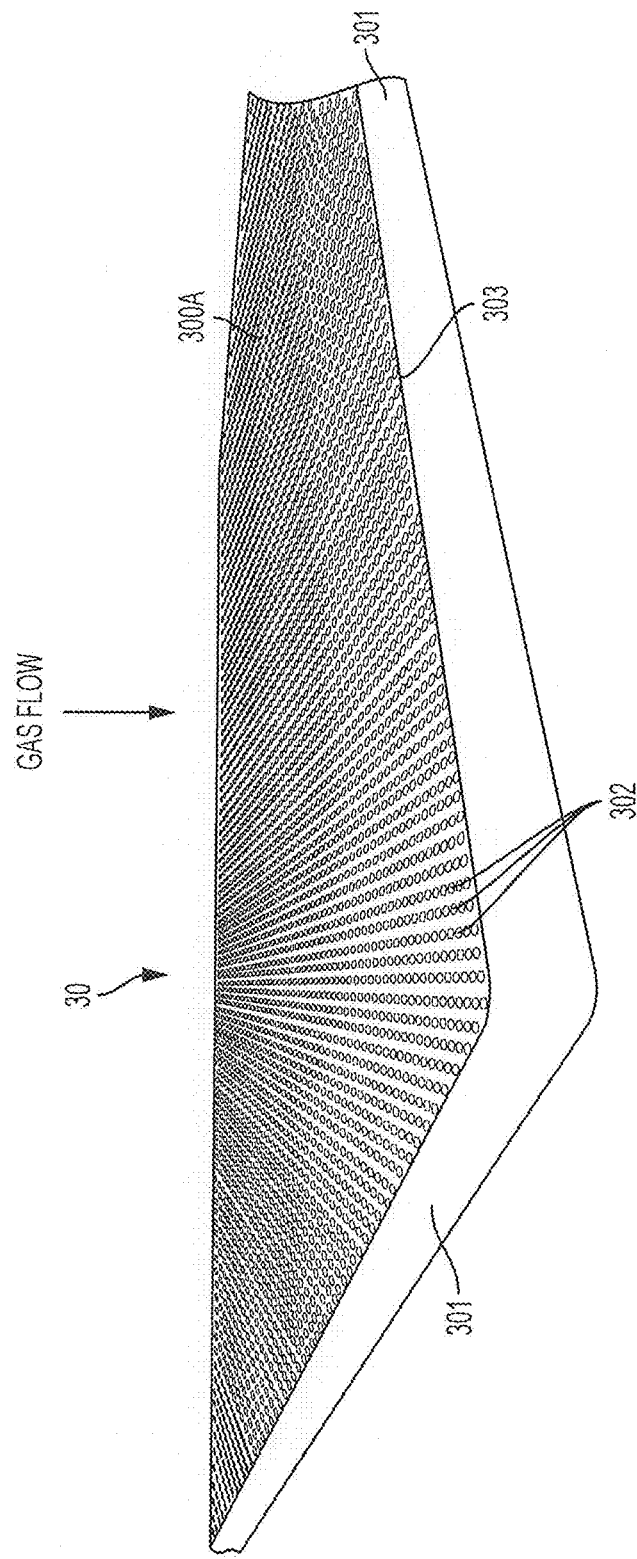
FIGS. 3A and 3B show screens for use in a selective catalytic reduction reactor system, according to embodiments of the invention.
Figure 3B:
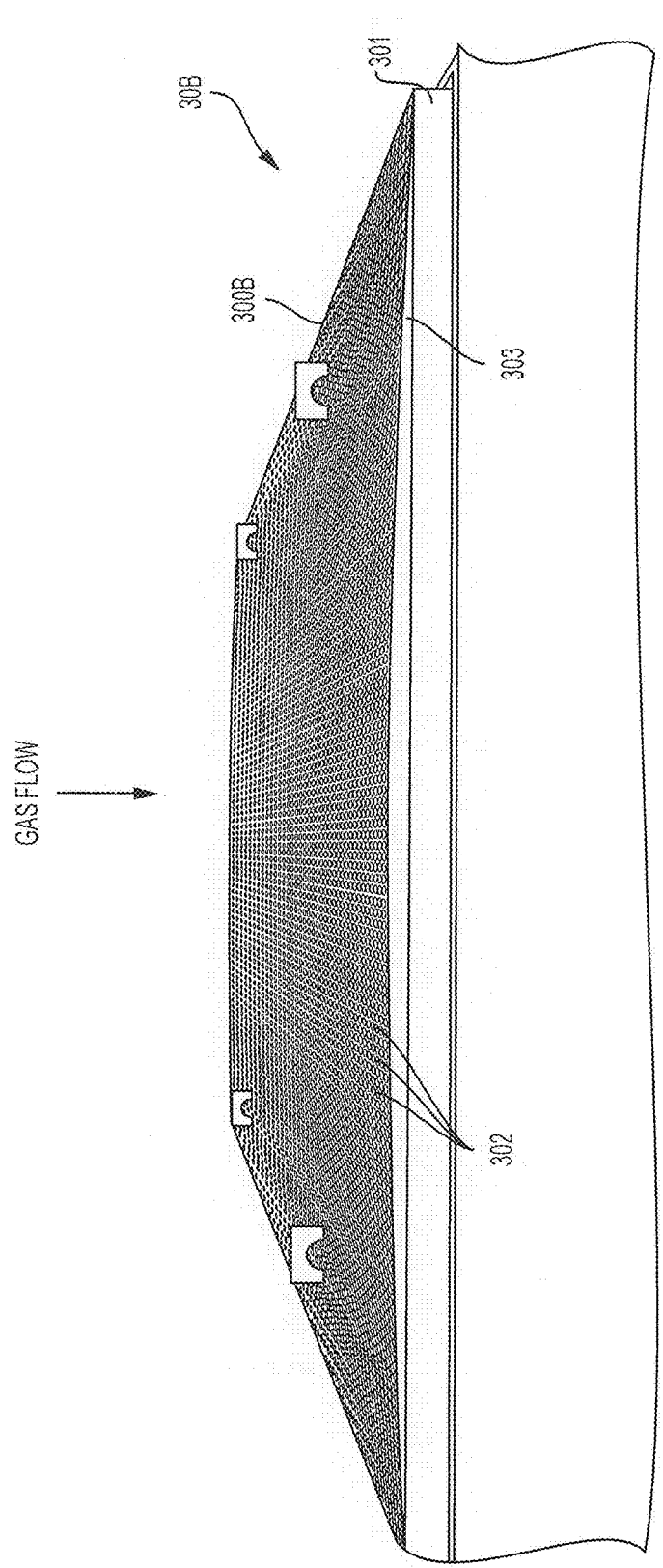

FIGS. 3A and 3B show catalyst plate screens 30 for use in a selective catalytic reduction reactor according to embodiments of the invention. Catalyst plate screens 30 are adapted to support a weight of at least 400 pounds. Catalyst plate screens 30 include a plurality of holes across its surface. Catalyst plate screens 30 are adapted to change the velocity distribution of flue gas as the flue gas flows through catalyst plate screens 30. Catalyst plate screens 30 may be configured so that the change in velocity distribution as a result of catalyst plate screens 30 comprises a 3 to 6% decrease or improvement in RMS of the overall velocity distribution of the flue gas.

Catalyst plate screens 30 may be made of materials such as metal (e.g. different types of steel), composite materials (e.g., carbon fiber composites, engineered materials, etc.), polymers and/or the like, and combinations thereof. In embodiments of the invention, catalyst plate screens 30 may include a perforated metal plate. For example, in embodiments of the invention, catalyst plate screens 30 may be made from 12 gauge carbon steel. In embodiments of the invention, catalyst plate screens 30 may include surface 300A and/or 300B, which includes holes 302 within top portion 303. A difference between catalyst plate screen 30 shown in FIG. 3A and catalyst plate screen 30 in FIG. 3B is that surface 300A is a flat surface while surface 300B is a dome shaped surface. Top portion 303 is supported by side walls 301. Top portion 303 may be connected to side walls 301 by methods such as welding, bolting, and the like. Catalyst plate screens 30 are shown in a square shape in FIGS. 3A and 3B (considering a top view); however, catalyst plate screens 30 may have other shapes such as rectangular, circular etc. In embodiments of the invention, catalyst plate screens 30 may each cover a surface area of 10 sq. ft. to 84 sq. ft. e.g., having a length in the range 2 ft. to 6 ft. and width in the range 5 ft. to 14 ft., plate thickness in the range of 10 gauge to 16 gauge, and side wall height of 1 in. to 12 in.

In embodiments of the invention, side walls 301 may be adapted to rest on an area surrounding a catalyst bed (e.g., SCR catalyst bed 209 in a SCR reactor 208) so that surface 300A or 300B is above the catalyst bed. In this way, catalyst plate screens 30 can support one or more loads above the catalyst bed without the one or more loads being imposed on the catalyst bed. For example, in embodiments of the invention, catalyst plate screens 30 are able to support the weight of a person and/or equipment so that the person can walk on and/or equipment can be moved on catalyst plate screens 30 without the weight of the person or the equipment impacting the catalyst bed. Hence, catalyst plate screens 30 provide a protective function to the catalyst bed.

In embodiments of the invention, catalyst plate screen 30 changes gas flow distribution as a result of the perforated plate structure providing a sufficient flow impacting surface and appropriate hole sizes. The flow impacting surface area of a screen is the surface area of the screen that a gas impacts when the gas is flowing perpendicular to the screen. For example, for a flat perforated plate screen, flow impacting surface area is the surface area of one side of the perforated plate screen (e.g., surface area of surface 300A or 300B of catalyst plate screens 30) minus the surface area of the holes in the screen.

In embodiments of the invention, catalyst plate screen 30 is a perforated plate structure and the flue gas flows and impacts, in a perpendicular or substantially perpendicular direction, surface 300A or surface 300B, which causes the flow vectors to separate and change direction as the flue gas accelerates through holes 302. Therefore, planar velocities are found on the surface of the screen which results in flue gas velocity normalization and helps to distribute the overall flow more evenly.

Further, in embodiments of the invention, the hole sizes of catalyst plate screen 30 can be adjusted to cause higher backpressure on some locations and lower backpressure on other locations. The resulting velocities through catalyst plate screen 30 are directly proportional to the backpressure created. Therefore, the velocity distribution through the screen can be altered.

Overall, in embodiments of the invention, the "plate with holes" structure of catalyst plate screen 30 acts as a pressure barrier which breaks-up and normalizes flow while still maintaining a low overall pressure differential, as opposed to typical catalyst wire mesh screens, which simply lets flue gas flow through at the velocity and concentration of the flue gas as it approaches the catalyst wire mesh screens.

In embodiments of the invention, holes 302 in surface 300A and surface 300B may have shapes such as the shape of a hexagon, circle, square, rectangular, triangle, pentagon, the like, and combinations thereof. In embodiments of the invention, holes 302 may be formed by perforating top portion 303 (including surface 300A or surface 300B). Alternatively or additionally, in embodiments of the invention, holes 302 may be formed when top portion 303 is created e.g., from a molding process in which the mold defines the formation of holes 302. In embodiments of the invention, top portion 303 may include different hole sizes arranged in a manner to achieve a change in the velocity distribution of a gas, such as a flue gas, flowed through catalyst plate screen 30. In embodiments of the invention, holes 302 include holes of different sizes, e.g., 2.5 mm. to 7.5 mm. arranged to achieve the change in the velocity distribution of the flue gas. In embodiments of the invention, multiple screens of different hole sizes may be combined to strategically change velocity distribution. For example, if a certain reactor experiences high velocities at its outer edges and requires 100 screens to cover the entire area, then 50 screens of hole sizes 2.5 mm to 4.5 mm. diameter (e.g., 3.5 mm. diameter) may be used on the outer edges and 50 screens of hole sizes 4.6 mm to 7.5 mm. diameter (e.g., 5.5 mm. diameter) in the center. In other words, if the velocity of gas flow is high on the outer edges of the catalyst, the screen may be adapted to have smaller holes on the outer edges (near the perimeter of the screen) in comparison to holes at the inner section of the screen (away from the perimeter). The converse may also be implemented so that if a certain reactor experiences low velocities at its outer edges and requires 100 screens to cover the entire area, then 50 screens of 4.6 mm to 7.5 mm. diameter (e.g., 5.5 mm. diameter) may be used on the outer edges and 50 screens of hole sizes 2.5 mm to 4.5 mm. diameter (e.g., 3.5 mm. diameter) in the center. In other words, if the velocity of gas flow is low on the outer edges of the catalyst, the screen may be adapted to have larger holes on the outer edges (near the perimeter of the screen) in comparison to holes at the inner section of the screen (away from the perimeter). In embodiments of the invention, the ratio of area of flow impacting surface area/holes of the screen is in the range of 45% to 65%.

Figure 4:
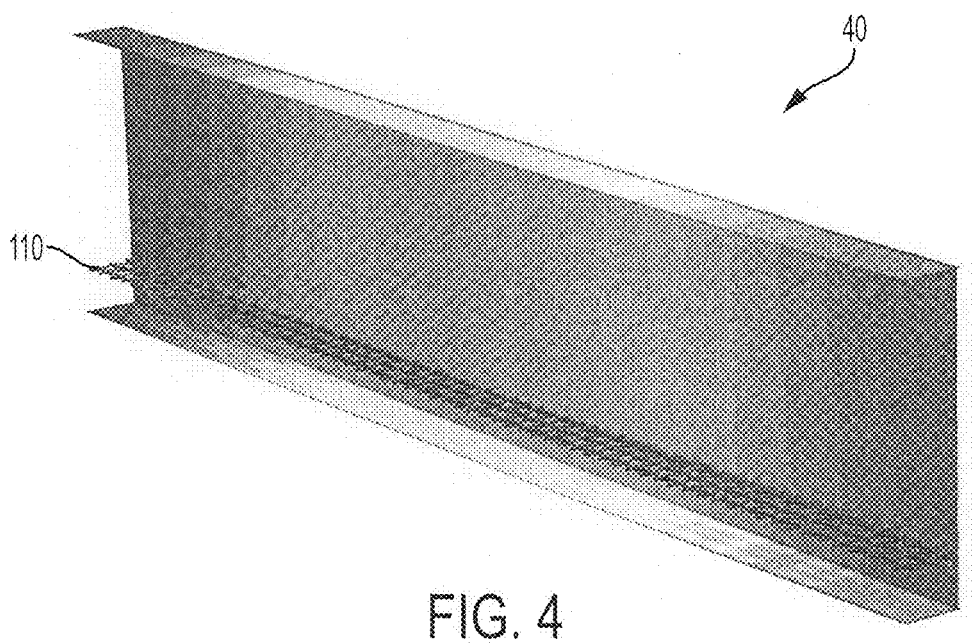
FIG. 4 shows a velocity distribution graph for a catalyst wire mesh screen.
Figure 5:
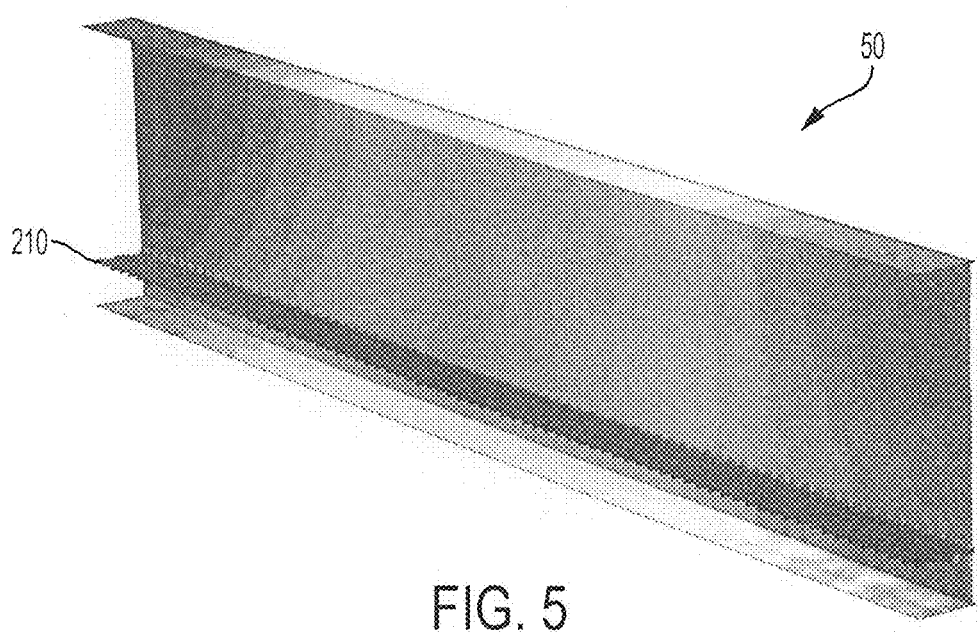
FIG. 5 shows velocity distribution graph for a flat metallic catalyst plate screen, according to embodiments of the invention.

In embodiments of the invention, catalyst plate screen 30 is adapted to normalize gas flow that has different velocities so that catalyst plate screen 30 increases the velocity of a section of the gas flowing to catalyst plate screen 30 at a velocity lower than the gas's average velocity and decreases the velocity of a section of the gas flowing to catalyst plate screen 30 with a velocity higher than the gas's average velocity. The representations of velocity distribution shown in FIG. 4 and FIG. 5 are from computation flow dynamic analysis comparing flow of gas through a catalyst wire mesh screen and a perforated metal plate screen. FIG. 4 shows velocity distribution graph for a catalyst wire mesh screen. FIG. 5 shows velocity distribution graph for a flat metallic plate screen, according to embodiments of the invention.

Computational Flow Dynamic (CFD) analysis was employed to study the effects of different screens. A baseline study was performed on a standard woven #3 Mesh which is typically installed above the top catalyst layer in typical SCR systems. The study was performed with an incoming velocity gradient which ranged from 5 ft./s on the left to 25 ft./s on the right along the x-axis. The initial CFD simulation shows the velocity profile is nearly unchanged as it impinges the #3 Mesh showing almost no normalization of the flue gas on the SCR catalyst. However, when catalyst plate screen 30 is used, it normalizes the flow. In other words, it increases low velocity areas in the flow and decreases high velocity areas in the flow. This is advantageous to the operation of the SCR. For example, existence of low flow areas is disadvantageous because it results in accumulation of fly ash particles. On the other hand, if the velocity of the flue gas is too high, it causes erosion of the catalyst. Also, uneven velocity distribution through the catalyst reduces the effectiveness of the catalyst to react equally with the flue gas.

Thus, in embodiments of the invention, catalyst plate screen 30 increases velocity of the flue gas in the low flow areas and decreases the high velocity of the high flow areas so that the velocity of all areas of the flow is closer to the average velocity of the flow. In other words, catalyst plate screen 30 redistributes the gas flow, which translates to an improvement in the reduction of fly ash buildup in the SCR.

In embodiments of the invention, top portion 303 is adapted to have a smooth surface (e.g., surface 300A and surface 300B) characterized by perforated plate with a roughness of less than 20 μm in $R_a$ (an $R_a$ of 20 μm). Because surface 300A and surface 300B are smooth, catalyst plate screen 30 resists the buildup of ash particles and so it is easier to clear away any ash particles deposited on catalyst plate screen 30 by cleaning methods such as methods that use air cannons and sonic horns. In embodiments of the invention in which catalyst plate screen 30 is a domed screen, as shown in FIG. 3B, surface 300B is a smooth surface and has a dome shape that cooperate to resist buildup of ash particles on catalyst plate screen 30. Catalyst plate screen 30 having domed screen surface 300B makes it easier for fly ash particles to slide off catalyst plate screen 30. In other words, configuring catalyst plate screen 30 to have domed screen surface 300B with a low friction surface may have a combined effect of causing the fly ash particles to slide easily from catalyst plate screen 30.

Embodiments of the invention improve the performance of cleaning equipment such as the sonic horns, and air cannons, by adapting surfaces 300A and 300B to be smooth. In this way, when the cleaning mechanisms vibrate the ash particles, this vibration of ash particles on the smooth surface moves the ash particles easier versus the rough finish of the contemporary catalyst wire mesh screen (e.g., catalyst wire mesh screen 110). Thus, embodiments of the invention are adapted to improve the performance of the sonic horns and to improve the effectiveness of the air cannon blast. By reducing the friction across catalyst plate screen 30 it is possible to keep the air cannon blast on the screen longer and provide additional cleaning.

Figure 6:
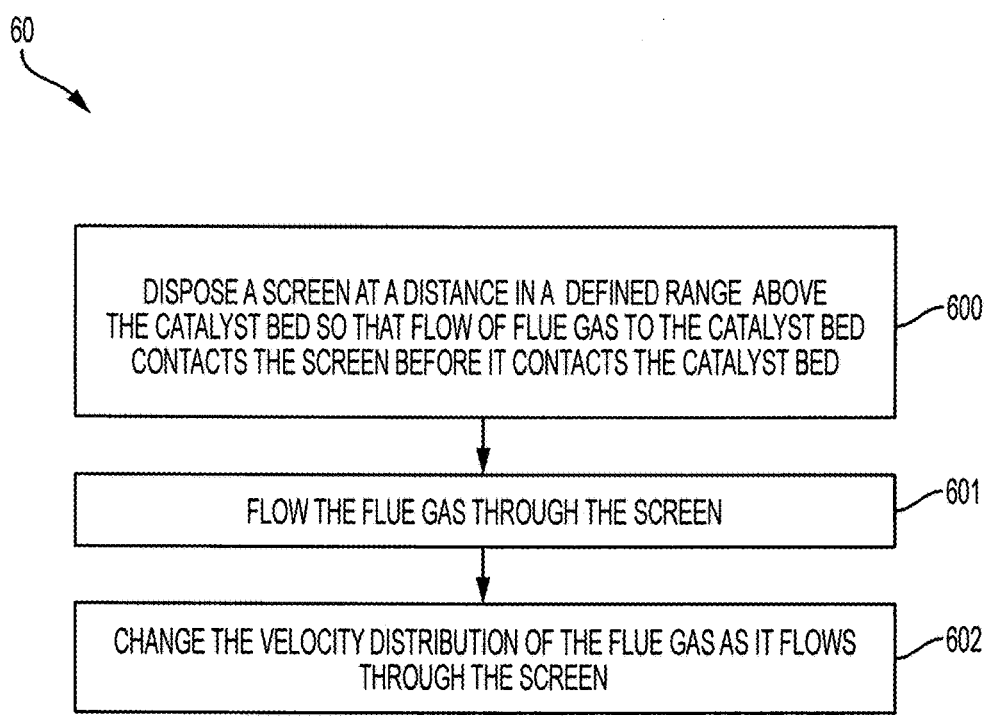
FIG. 6 shows a method for protecting a catalyst bed in a selective catalytic reduction reactor, according to embodiments of the invention.

FIG. 6 shows method 60 for protecting a catalyst bed in a selective catalytic reduction reactor, according to embodiments of the invention. Method 60 may involve using catalyst plate screens described herein, such as catalyst plate screen 30. Method 60 may include, at block 600, disposing a screen at a distance in a range of 1 in. to 12 ft. above the catalyst bed so that flow of flue gas to the catalyst bed contacts the screen or passes through the screen before it contacts the catalyst bed or passes through the catalyst bed. The screen may be adapted to withstand a weight of at least 400 pounds without that weight being imposed on the catalyst. The screen has a plurality of holes across its surface. Method 60 may then include, at block 601, flowing the flue gas through the screen. At block 602, method 60 may further include, changing the velocity distribution of the flue gas as it flows through the screen, wherein the change in velocity distribution as a result of the screen comprises 3 to 6% decrease or improvement in RMS of the overall velocity distribution.

Overall, there are several benefits to implementing catalyst plate screens to protect catalyst beds in selective catalytic reduction reactors according to embodiments of the invention as compared with conventional catalyst wire mesh screens. For example, use of catalyst wire mesh screens result in the buildup of piles of fly ash on the catalyst wire mesh screens over time. In contrast, the catalyst plate screen, according to embodiments of the invention, resists ash build up as a result of the smoother surface, that interfaces with the fly ash particles and/or, in the case of some embodiments, the dome shape of the catalyst plate screen. The smoother surface and the dome causes the fly ash particles to slide off the catalyst plate screen easily. In this way, there is no, or minimal, fly ash buildup on the catalyst plate screen. In contrast, the catalyst wire mesh screen is a rough finish material that is placed above the catalyst bed, resulting in fly ash accumulating in and on this rough finish material. Fly ash can get into the mesh, get trapped and thereby create piles of fly ash.

The smooth finished surface of the catalyst plate screen according to embodiments of the invention provides a further benefit in that it increases the cleaning range of air cannons because the pressure differential of the catalyst plate screen keeps the air cannon blast on the screen for a further distance as compared with the catalyst wire mesh screen. Similarly, sonic horns are more effective when cleaning the catalyst plate screen as compared to the catalyst wire mesh screen because of the catalyst plate screen's smooth surface. The sonic horns have limited effectiveness in cleaning the catalyst wire mesh screen because the catalyst wire mesh screen has a rough surface and, as a result, the sonic horns don't move the fly ash enough to get it off the catalyst wire mesh screen. Instead, often, the sonic horns pack the fly ash into the rough areas of the catalyst wire mesh screen. In this sense, the catalyst plate screen provides a further benefit in that it does not allow the packing of fly ash as compared with the catalyst wire mesh screen.

A further benefit of the catalyst plate screen according to embodiments of the invention is that it aids the flow of flue gas. In contrast, the catalyst wire mesh screen does not aid and has minimal to no effect on flue gas flow. Thus, plugging and creation of ash piles tend to develop for catalyst wire mesh screens, which in turn results in increase in flue gas velocity and angled flow which causes the catalyst to erode. The catalyst plate screen, according to embodiments of the invention, as a result of its flow aid properties, normalizes air flow as discussed above. Further, the catalyst plate screen's resistance to fly ash buildup avoids such flue gas velocity increase and angled flow. With the catalyst plate screen according to embodiments of the invention, there can be better control over the velocity angles, allowing flow to the catalyst and protecting the catalyst from air cannon flow. Whereas, with the catalyst wire mesh screen, there is little control over velocity angles resulting in flow from a variety of angles, which results in erosion. Thus, there is less catalyst erosion when the catalyst plate screen is used as compared with the catalyst wire mesh screen.

A further benefit of the catalyst plate screen according to embodiments of the invention is that it protects the catalyst from air cannon blasts better than the catalyst wire mesh screen. The catalyst plate screen provides this benefit over the catalyst mesh screen because of the higher flow impacting surface area/area of holes and greater pressure drop as compared with the catalyst wire mesh screen. Because of the higher flow impacting surface area of the catalyst plate screen (more open area in the catalyst wire mesh screen), there is less opportunity for the blast of air from the air cannon to reach and damage the catalyst with the catalyst plate screen.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for use in a selective catalytic reduction reactor, the system comprising:
   a catalyst bed; and
   a screen located at a distance in a range of 1 in. to 12 ft. above the catalyst bed so that flow of flue gas to the catalyst bed contacts the screen or passes through the screen before the flow of flue gas contacts the catalyst bed or passes through the catalyst bed, the screen adapted to support a weight of at least 400 pounds above the catalyst bed so that the weight is not imposed on the catalyst bed, the screen having a plurality of holes across its surface, wherein the screen is adapted to change velocity distribution of the flue gas as it flows through the screen, wherein the change in velocity distribution as a result of the screen comprises a 3 to 6% decrease in Root Mean Square (RMS) of overall velocity distribution of the flue gas.

2. The system of claim 1 further comprising:
   a duct adapted to channel the flue gas that emanates from a boiler to the selective catalytic reduction reactor.

3. The system of claim 1, further comprising:
   a LPA separator for separating LPA from the flue gas prior to the flue gas contacting the screen.

4. The system of claim 1, wherein the screen comprises a perforated metal plate.

5. The system of claim 1, wherein the plurality of holes comprises holes of different sizes arranged in a manner to achieve the change in the velocity distribution of the flue gas.

6. The system of claim 1, wherein the plurality of holes comprises holes of different sizes are arranged so that holes nearer to the perimeter of the screen are smaller than holes further from the perimeter of the screen.

7. The system of claim 1, wherein the screen comprises a surface having a roughness of 20 µm or less.

8. The system of claim 1, wherein the screen is adapted to normalize flue gas flow that has different velocities so that the screen increases the velocity of a section of the flue gas flowing to the screen at a velocity lower than the flue gas's average velocity and decreases the velocity of a section of the flue gas flowing to the screen with a velocity higher than the flue gas's average velocity.

9. The system of claim 1 wherein the ratio of area of holes/area of screen surface is in a range of 45% to 65%.

10. The system of claim 1, wherein the holes are shaped as a selection from the list consisting of: hexagon, circle, square, rectangular, triangle, pentagon, and combinations thereof.

11. The system of claim 1, wherein the screen comprises 12 gauge carbon steel.

12. The system of claim 1, wherein the screen comprises an elliptical shape extending from one end of the screen to another end of the screen, the elliptical shape defined in a plane perpendicular to the flow of flue gas.

13. A method for protecting a catalyst bed in a selective catalytic reduction reactor, the method comprising:
 disposing a screen at a distance in a range of 1 in. to 12 ft. above the catalyst bed so that flow of flue gas to the catalyst bed contacts the screen or passes through the screen before the flow of flue gas contacts the catalyst bed or passes through the catalyst bed, the screen adapted to withstand a weight of at least 400 pounds without that weight being imposed on the catalyst bed, the screen having a plurality of holes across its surface;
 flowing the flue gas through the screen; and
 changing velocity distribution of the flue gas as it flows through the screen, wherein the change in velocity distribution as a result of the screen comprises 3 to 6% decrease in Root Mean Square (RMS) of overall velocity distribution of the flue gas.

14. The method of claim 13, wherein the screen comprises a perforated metal plate.

15. The method of claim 13, wherein the screen comprises a surface having a $R_a$ of 20 μm.

16. The method of claim 13, wherein, when the flue gas flow has different velocities, normalizing the flue gas flow comprises increasing the velocity of a section of the flue gas flowing to the screen at a velocity lower than the flue gas's average velocity and decreasing the velocity of a section of the flue gas flowing to the screen with a velocity higher than the flue gas's average velocity.

17. The method of claim 13, wherein the ratio of area of holes/area of screen surface is in range of 45% to 65%.

18. The method of claim 13, wherein the holes are shaped as a selection from the list consisting of: hexagon, circle, square, rectangular, triangle, pentagon, and combinations thereof.

19. The method of claim 13, wherein the screen comprises 12 gauge carbon steel.

20. The method of claim 13, wherein the screen comprises an elliptical shape extending from one end of the screen to another end of the screen, the elliptical shape defined in a plane perpendicular to the flow of flue gas.

* * * * *